US010587878B2

(12) United States Patent
Kudana et al.

(10) Patent No.: US 10,587,878 B2
(45) Date of Patent: *Mar. 10, 2020

(54) SYSTEMS AND METHODS FOR QUANTIZATION OF VIDEO CONTENT

(71) Applicant: Texas Instruments Incorporated, Dallas, TX (US)

(72) Inventors: Arun Shankar Kudana, Bengaluru (IN); Soyeb Nagori, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,405

(22) Filed: Sep. 24, 2018

(65) Prior Publication Data

US 2019/0037215 A1   Jan. 31, 2019

Related U.S. Application Data

(63) Continuation of application No. 13/633,292, filed on Oct. 2, 2012, now Pat. No. 10,085,023.

(30) Foreign Application Priority Data

Oct. 5, 2011 (IN) .......................... 3450/CHE/2011

(51) Int. Cl.
*H04N 19/126* (2014.01)
*H04N 19/139* (2014.01)
*H04N 19/176* (2014.01)

(52) U.S. Cl.
CPC ........ *H04N 19/126* (2014.11); *H04N 19/139* (2014.11); *H04N 19/176* (2014.11)

(58) Field of Classification Search
CPC ... H04N 19/126; H04N 19/139; H04N 19/176
USPC .................................................... 375/240.03
See application file for complete search history.

(56) References Cited

U.S. PATENT DOCUMENTS

| | | | |
|---|---|---|---|
| 2003/0206584 A1 | 11/2003 | Morita et al. | |
| 2007/0263720 A1 | 11/2007 | He | |
| 2010/0208804 A1* | 8/2010 | Yu | H04N 21/2383 375/240.12 |
| 2011/0122942 A1* | 5/2011 | Kudana | H04N 19/147 375/240.03 |
| 2011/0182356 A1* | 7/2011 | Ammu | H04N 19/197 375/240.03 |

OTHER PUBLICATIONS

U.S. Appl. No. 13/633,292.

* cited by examiner

*Primary Examiner* — Allen C Wong
(74) *Attorney, Agent, or Firm* — Ebby Abraham; Charles A. Brill; Frank D. Cimino

(57) ABSTRACT

Several methods, systems, and computer program products for quantization of video content are disclosed. In an embodiment, the method includes determining by a processing module, motion information associated with a block of video data of the video content. A degree of randomness associated with the block of video data is determined by the processing module based on the motion information. A value of a quantization parameter (QP) associated with the block of video data is modulated by a quantization module based on the determined degree of randomness.

20 Claims, 7 Drawing Sheets

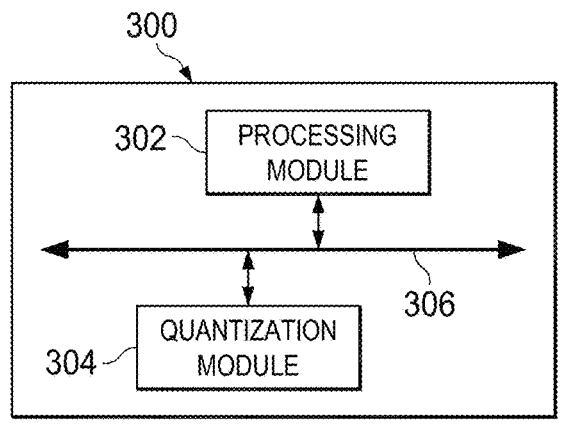

FIG. 3A

| CATEGORY OF BLOCKS | CRITERION FOR CLASSIFICATION OF A BLOCK OF VIDEO DATA INTO THE CATEGORY OF BLOCKS | SCHEME FOR MODULATION OF VALUE OF QP |
|---|---|---|
| #1 | DEGREE OF RANDOMNESS ($\Delta$) < $\Delta$ thr 1 | $QP_{new} = Q^*F_1$ |
| #1 | $\Delta < \Delta thr2$ && ($\Delta >= \Delta thr1$) | $QP_{new} = Q^*F_2$ |
| ⋮ | ⋮ | ⋮ |
| #X-1 | $\Delta < \Delta thrX-1$ && ($\Delta >= \Delta thrX-2$) | $QP_{new} = Q^*F_{X-1}$ |
| #X | $\Delta < \Delta thrX$ && ($\Delta >= \Delta thrX-1$) | $QP_{new} = Q$ |
| #X+1 | $\Delta < \Delta thrX+1$ && ($\Delta >= \Delta thrX$) | $QP_{new} = Q^*F_{X+1}$ |
| ⋮ | ⋮ | ⋮ |
| N | $\Delta < \Delta thrN$ && ($\Delta >= \Delta thrN-1$) | $QP_{new} = Q^*F_N$ |

FIG. 3B

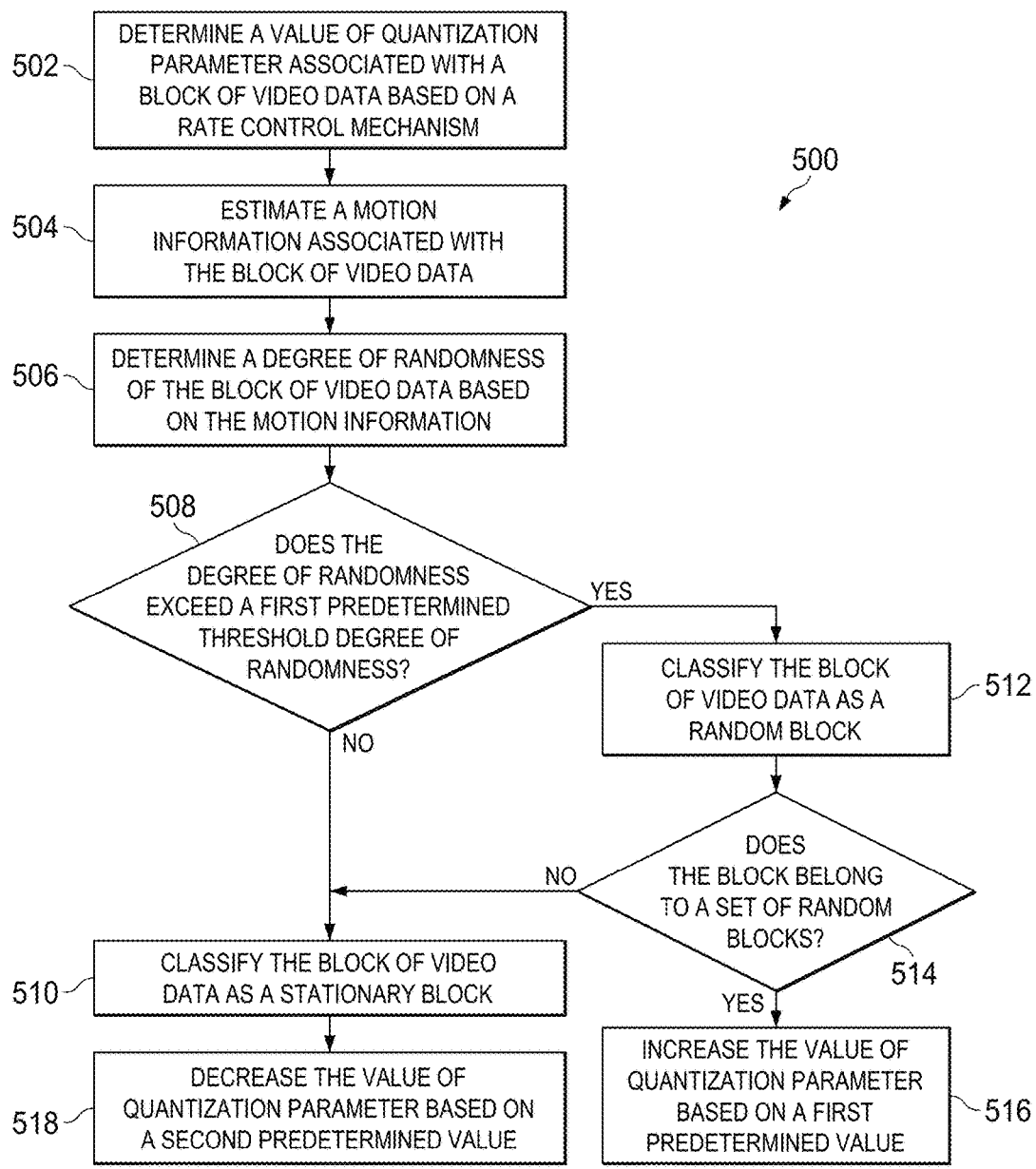

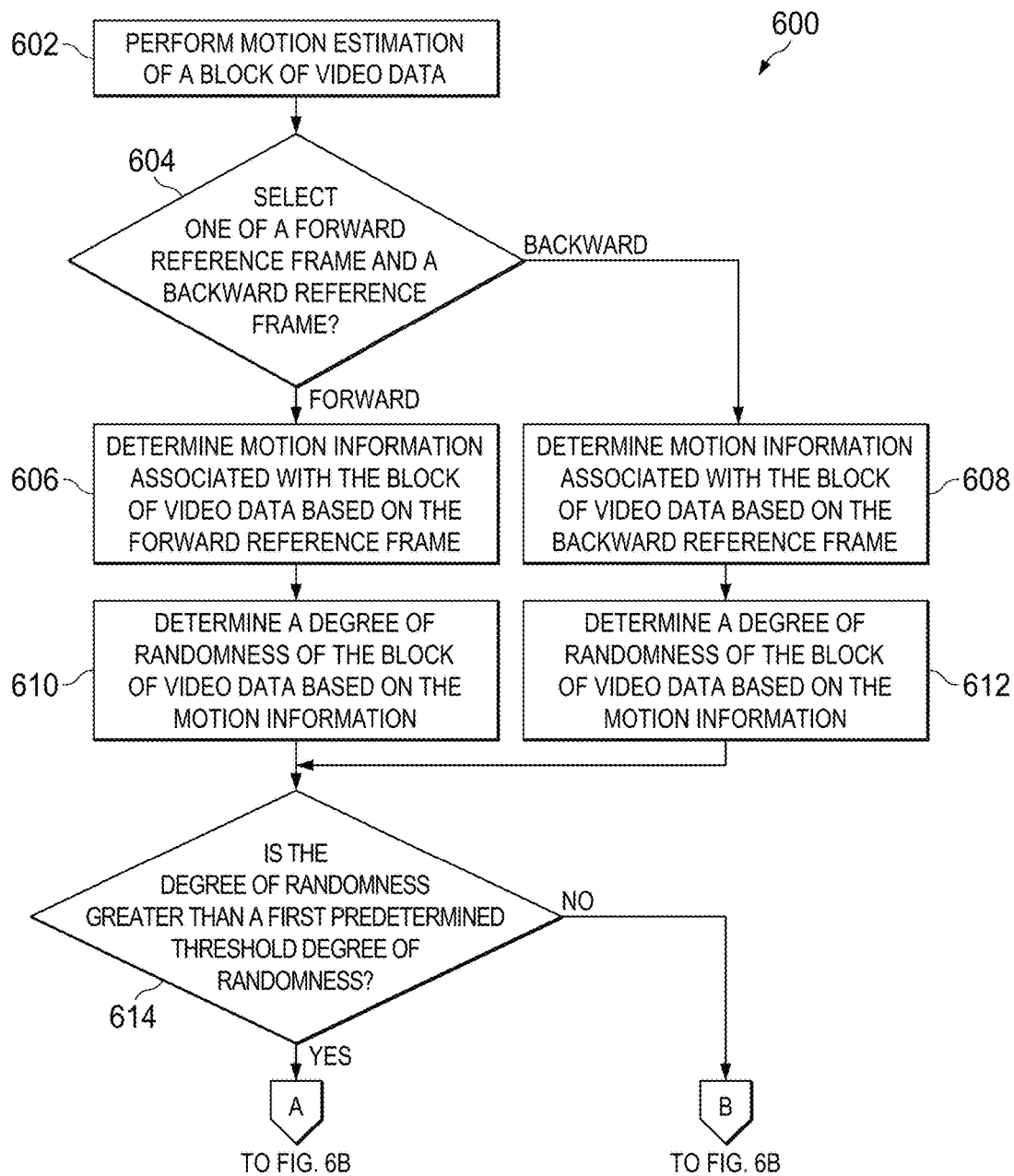

SYSTEMS AND METHODS FOR QUANTIZATION OF VIDEO CONTENT

CROSS REFERENCE TO RELATED APPLICATIONS

This application is a continuation of U.S. patent application Ser. No. 13/633,292, filed Oct. 2, 2012, which application claims the benefit of Indian Provisional Patent Application No. 3450/CHE/2011, filed in the Indian Patent Office on Oct. 5, 2011, both of which are incorporated herein by reference in their entirety.

TECHNICAL FIELD

The present disclosure generally relates to the field of video encoding.

BACKGROUND

Pursuant to an exemplary scenario, various video coding paradigms suggest a block-based coding of video content, where each frame of video content is represented in terms of a plurality of blocks, and where coding techniques are applied to the blocks so as to remove spatial and/or temporal redundancies in the frames corresponding to the video content. Pursuant to an exemplary scenario, the coding techniques include transformation of video content into frequency coefficients, quantization of the frequency coefficients, and encoding of the quantized coefficients. The quantization may be controlled so as to achieve a desired quality of the coded video content.

SUMMARY

Various methods, systems, and computer program products for quantization of video content are disclosed. In an embodiment, the method includes determining by a processing module, motion information associated with a block of video data associated with the video content. In an embodiment, a degree of randomness associated with the block of video data is determined by the processing module based on the motion information. A value of a quantization parameter (QP) for the block of video data is modulated by a quantization module based on the determined degree of randomness.

Additionally, in an embodiment, a system for quantization of video content is disclosed. The system includes a processing module and a quantization module. The processing module is configured to determine motion information associated with a block of video data associated with the video content. The processing module is further configured to determine a degree of randomness associated with the block of video data based on the motion information. The quantization module is configured to modulate a value of QP for the block of video data based on the determined degree of randomness.

Moreover, in an embodiment, a non-transitory computer-readable medium storing a set of instructions that when executed cause a computer to perform a method of encoding of pictures is disclosed. The method includes, determining motion information associated with a block of video data associated with the video content. In an embodiment, a degree of randomness associated with the block of video data is determined based on the motion information. In an embodiment, a value of a QP for the block of video data is modulated based on the determined degree of randomness.

BRIEF DESCRIPTION OF THE FIGURES

FIG. 3A is a block diagram of an exemplary system for quantization of video content, in accordance with an embodiment;

FIG. 3B illustrates an exemplary table depicting classification of a block of video data into a category of bocks from among a plurality of categories of blocks, in accordance with an embodiment;

FIG. 5 depicts a flow diagram of method of quantization of the video content, in accordance with another embodiment;

FIGS. 6A-6B depict a flow diagram of method of quantization of video content, in accordance with yet another embodiment.

DETAILED DESCRIPTION

Figure 1:
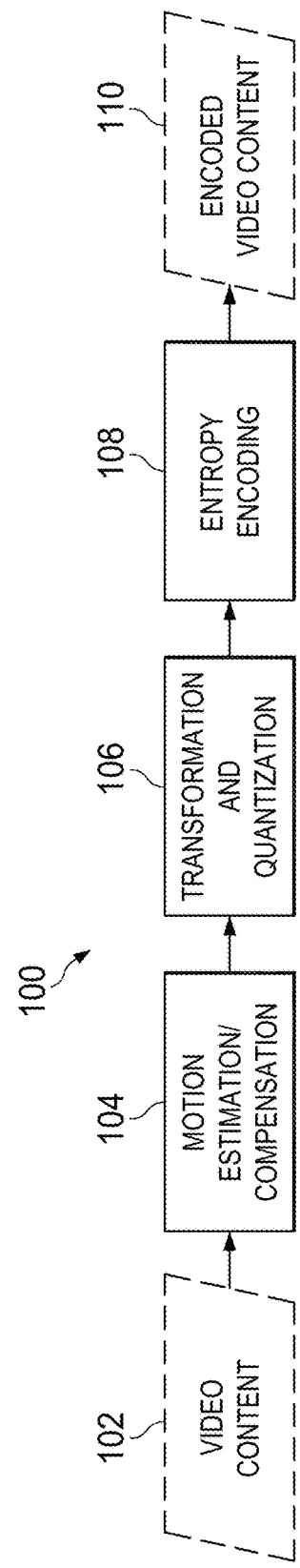
FIG. 1 illustrates an exemplary overview of an exemplary video content encoding process, in accordance with an exemplary scenario.

In the following description, for purposes of explanation, numerous specific details are set forth in order to provide a thorough understanding of the disclosure. It will be apparent, however, to one skilled in the art that the disclosure can be practiced without these specific details. In other instances, structures and devices are shown in block diagram form only in order to avoid obscuring the disclosure. Reference in this specification to "one embodiment" or "an embodiment" means that a particular feature, structure, or characteristic described in connection with the embodiment is included in at least one embodiment of the disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the disclosure is set forth without any loss of generality to, and without imposing limitations upon, the disclosure.

Pursuant to an exemplary scenario, an efficient resource allocation between motion information and a motion compensated video content is a key feature in a video coding for achieving good performance. In various coders it is possible to implement a way of sharing a bit-rate between motion information including one or more motion vectors and a motion compensated video content by selecting various coding modes for a block of video data associated with a video content. The block of video data may include, but are not limited to, a block of pixels, and one or more macro blocks. However, it is noted that when the video content is encoded at low and very low bit-rates, a large quota of resources is allocated to the one or more motion vectors leading to a sub-optimal performance. Various embodiments of the present technology, however, provide methods, systems, and computer program products for quantization of video content that are capable of overcoming these and other obstacles and providing additional benefits.

The following description and accompanying figures demonstrate that the present technology may be practiced or otherwise implemented in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

FIG. 1 illustrates an exemplary overview of an exemplary video encoding process in accordance with an exemplary scenario. More particularly, FIG. 1 illustrates a simplified overview of an encoding process flow 100 for encoding video content 102. Examples of the video content 102 may include, but is not limited to, one or more pictures, one or more frames, and one or more fields. Referring to FIG. 1, a video encoder may perform the encoding process flow 100 so as to achieve a compression of the video content 102. The video content 102 may be compressed so as to efficiently utilize a storage capacity (for example, during storage of the video content 102) or a spectrum/bandwidth (for example, during transmission of the video content 102).

The video encoder may be configured within a video system. Examples of the video system may include, but are not limited to, (1) video devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the video encoder may be any machine capable of executing a set of instructions (sequential and/or otherwise) so as to perform an encoding of video content 102.

The video content 102 may be received by the video encoder from a media capture device. Examples of a media capture device may include, but are not limited to, a video camera and a camcorder. The media capture device may be, for example, a stand-alone device or a part of a mobile device, such as, for example, a Smartphone, or a data processing device, such as, for example, a personal computer, a laptop device or a personal digital assistant (PDA). The video content 102 may also be received by the video encoder from a transcoding system, which may be a stand-alone device or a part of a media capture device. Examples of the video content 102 may include, for example, video data, image data, graphical data, textual data or any combination thereof.

Pursuant to an exemplary scenario, the video content 102 may include a plurality of video contents, and each video content from among the plurality of video contents may include several blocks of data. During motion estimation/compensation 104 of the encoding process flow 100, a prediction for each block from among a number of blocks of the video content 102 is determined and subtracted from the block in order to form residual video content. The prediction for each block of the video content 102 may be performed based on previously encoded blocks of the video content 102, either from a current frame (e.g., intra prediction) or from frames that have already been encoded and transmitted (e.g., inter prediction). Identifying a suitable inter prediction may be referred to, for example, as "motion estimation", and subtracting the inter prediction from the current block may be referred to, for example, as "motion compensation".

After motion estimation/compensation 104, and during transformation and quantization 106, the residual video content is transformed (for example, from a spatial domain to a frequency domain) and quantized. During transformation, the video content (e.g. a frame) is divided into a plurality of discrete blocks (e.g., 8×8 pixels). Each of the plurality of discrete blocks is subjected to a transform (e.g., a discrete cosine transform (DCT)) using a set of coefficients associated with a coefficient matrix to calculate one or more frequency components. The one or more frequency components may be calculated in a horizontal direction and/or vertical direction to obtain a resultant block of frequency components. The set of coefficients is a weighting value for a pre-selected basis pattern. The weighted pre-selected basis patterns, when combined, are capable of re-creating the residual video content. The set of transform coefficients are then quantized so as to achieve compression.

During quantization, the one or more frequency components are pre-multiplied by a scaling factor and divided element-wise by a quantization matrix to obtain one or more resultant elements. Each of the resultant elements is rounded off to obtain a set of quantized transform coefficients. The quantization matrix is configured to provide a larger resolution to more perceivable frequency components over less perceivable frequency components associated with the video content in addition to reducing several frequency components to nil (or zero) that may be encoded with high efficiency. The extent of the reduction may be varied by changing the scaling factor to thereby reduce a bandwidth requirement when compared to using an un-scaled quantization matrix.

The quantized transform coefficients, along with certain information (such as, for example, information pertaining to the structure of compressed data, information about a complete sequence of video content 102 and/or information that enables a decoder to re-create the prediction), are subject to entropy encoding 108 (e.g., conversion into binary codes using variable length coding and/or arithmetic coding). The entropy encoding 108 of the video content 102 produces an efficient, compact and binary representation of the information in the form of encoded video content 110. The encoded video content 110 may then be stored and/or transmitted.

Embodiments of the present technology, relates to quantization of the video content during the transformation/quantization 106 of the encoding process 100 of FIG. 1. It is noted that the term "quantization" is construed as referring to a process of compressing data including a range of values associated with the video content (for example, video content 102 of FIG. 1) to a single quantum value. Since the quantization process involves compression of the set of values to a single value, it is an irreversible and a lossy compression process, and results in generation of a quantization noise. Various video coding paradigms define a discrete set of quantization settings such as a quantization step size for performing quantization of the video content.

The quantization step size is described further along with equation (1). The quantization settings may be identified by an identifier such as a quantization parameter (QP). The value of QP may include, for example, an integer that indexes one or more quantization settings. The value of QP may determine an amount of quantization noise introduced during the quantization.

The quantization settings indexed by the value of QP may be different in different video coding paradigms. During quantization, a portion of data that more precisely describes a transform coefficient is discarded. A quantity of the data discarded during quantization depends upon the quantization settings. The amount of data discarded increases with an increase in the magnitude of the quantization step sizes which consequently leads to an increase in compression efficiency and a reduction in a compression rate during encoding. Also, an increase in the amount of data discarded, renders a reconstructed video content to be a rough approximation of and/or a distorted version of the video content. The value of QP used during quantization determines an amount of data discarded and thus the value of QP may be representative of a perceptual quality of an encoded video content.

In an embodiment, each quantized coefficient (represented as Zij) obtained by quantization of the video content is given by equation (1) as below:

$$Zij = \text{round}(Yij/Q\text{step}) \quad (1)$$

Yij is a coefficient and Qstep is the quantization step size.

In encoding paradigms, such as H.264, a total of 52 quantization step size values are supported and each quantization step size value is indexed by the QP. In an embodiment, the quantization step size value doubles in size for every increment of 6 in the value of QP. Examples values of QP in the H.264 encoding paradigm may range from 0 up to 51 and the corresponding quantization step size values may range from 0.625, 0.6875, 0.8125, and so on up to 224.

Based on the quantization settings, the quantization employed may be of various types, including, for example, a fine quantization and a coarse quantization. The fine quantization may be performed using finer quantization settings (e.g., small magnitude of quantization step sizes). The size of the video content is reduced by, for example, 5% to 7% of an original size upon being subjected to the fine quantization. The coarse quantization may be performed using coarser quantization settings (e.g., large magnitude of quantization step sizes). The size of the video content is reduced by, for example, 0.5% to 3% of the original size upon being subjected to the coarser quantization.

Additionally, an amount of quantization holds a direct correlation with a bit-rate during the encoding process 100. It is noted that the term "bit-rate" is construed as referring to a number of bits used per unit of time for rendering the encoded video content. Also, different types of video content may be represented using different number of bits even while sharing common pixel dimensions and on being encoded with a common value of QP. Moreover, it is noted that the video content quantized using the higher value of QP (for example coarse quantization) requires a lower number of bits than the same video content quantized using the smaller value of QP (for example fine quantization). It is also noted that, an average bit-rate requirement of the video content decreases with an increase in the value of QP used to quantize the video content.

Embodiments of the present technology, provide methods, systems, and computer program products for quantization of video content based on a degree of randomness associated with a block of video data associated with the video content so as to regulate a bit-rate while maintaining a quality of the video content. It is noted that the term "degree of randomness" is construed as referring to a measure of an extent of in-coherency in motion associated with a block of video data associated with the video content relative to one or more blocks of video data within the video content. An exemplary video content illustrating varying degree of randomness associated with various portions thereof is illustrated and explained in FIG. 2.

Figure 2:
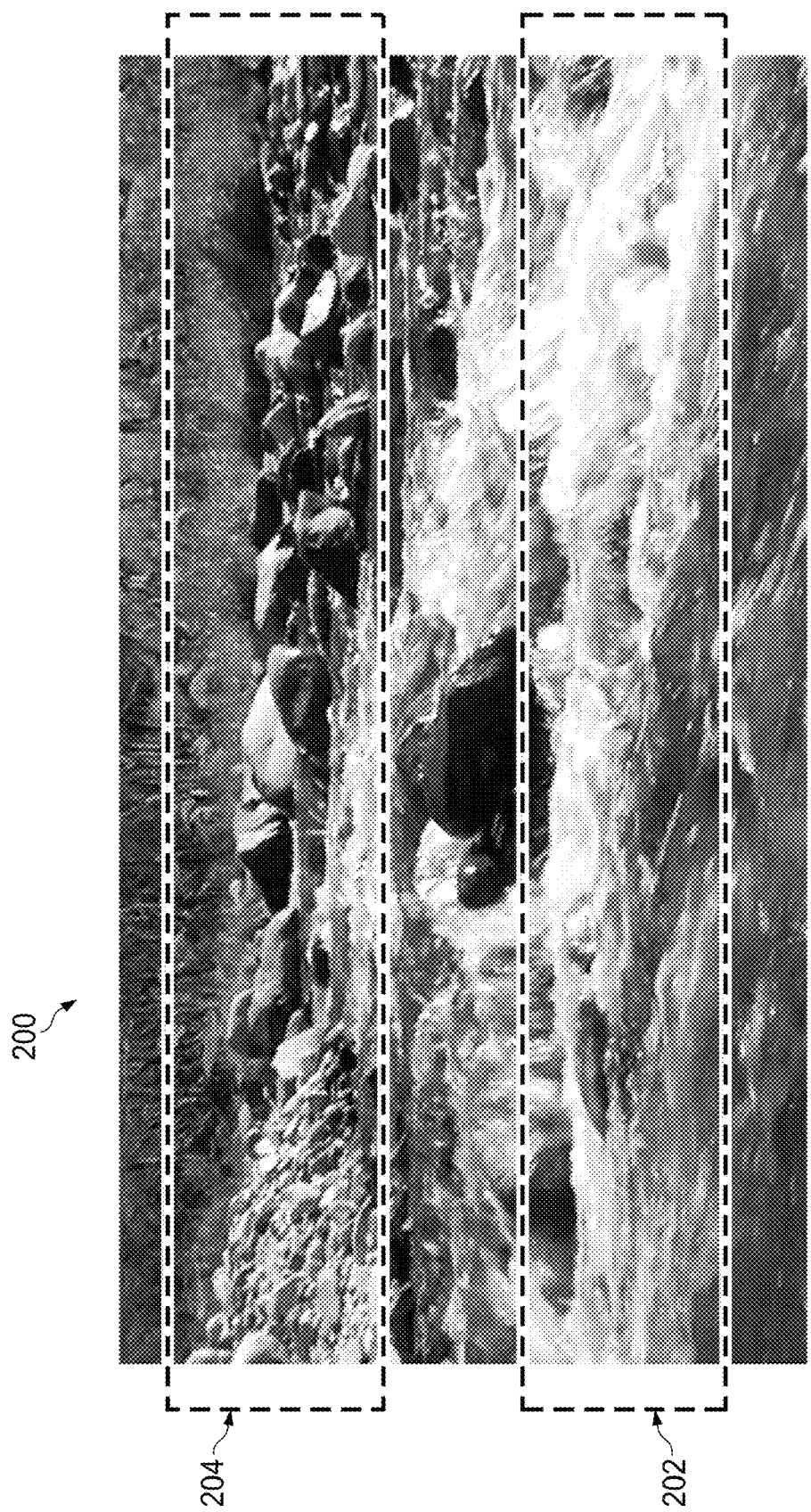
FIG. 2 illustrates an exemplary video content, comprising portions of varying degrees of randomness, in accordance with an embodiment.

FIG. 2 illustrates an exemplary video content, for example a picture 200 comprising portions of varying degrees of randomness in accordance with an embodiment. As illustrated in FIG. 2, the picture 200 comprises a scene of water flowing in a lake. The picture 200 also shows other objects such as big stones and trees that are substantially stationary. The regions of the picture 200 comprising objects that are associated with a large extent of in-coherency in activity/motion may be referenced as 'random'. For example, the region showing moving water, such as region 202 may be categorized as a random block. The regions of the picture comprising objects that are substantially associated with relatively small extent of in-coherency or a large extent of coherency in activity/motion may be referenced as 'stationary' regions. For example, the region showing trees and stones, such as region 204 may be categorized as a stationary block. It can be observed from FIG. 2 that the stationary block such as blocks associated with the region 204 having high detail shows poor quality at low bit-rates. It can also be observed that for the random blocks such as blocks associated with the region 202, the effect of perceptual quality is not significant when played in real time.

Various embodiments of the present technology provides methods, systems, and computer program products for encoding of pictures that are capable of improving the perceptual quality of the video content. For example, various embodiments of the present technology provides methods, systems, and computer program products that are configured to quantize the video content based on the degree of randomness associated with the portions of video content. In an embodiment, the portions of video content (also referred to as block of video data) that are situated in between the randomly moving objects and randomly moving objects themselves may be quantized coarsely, so that the compression efficiency of video content may be improved without increasing the noticeable visual distortion. Additionally, the portions of the video content that are substantially stationary or associated with coherent motion may be quantized finely. The quantization of the objects and/or portions of the video content based on the degree of randomness facilitates in improving the perceived quality of the video content at low bit-rates since the increase in quantization noise (due to coarser quantization) at the random blocks is not significant as compared to the improvement of the video quality at the stationary blocks (due to finer quantization). A system for quantization of the video content based on the degree of randomness associated with the video content is described herein with reference to FIG. 3A.

FIG. 3A is a block diagram of an exemplary system 300 for quantization of a video content, in accordance with an embodiment. In an embodiment, the system 300 is configured to be included within a video encoder. In an embodiment, the system 300 may be communicatively associated with a video encoder such that the video content (e.g., video content 102 of FIG. 1) may be received and/or such that motion compensated video content may be provided to the video encoder. In an exemplary embodiment, the system 300 may be configured within a personal computer (PC), a tablet PC, a PDA, a mobile communication device, a web appliance, a set-top box (STB), an embedded system and/or any machine capable of executing a set of instructions (sequential and/or otherwise) so as to perform quantization of the video content based on a degree of randomness associated with the video content.

It is noted that the term "degree of randomness" is construed as referring to a measure of an extent of incoherency in motion associated with a block of video data (e.g., a macro block) associated with the video content relative to one or more blocks of video data within the video content. In an embodiment, the system 300 includes a processing module 302 and a quantization module 304. In an embodiment, the processing module 302 and the quantization module 304 are configured to communicate with each other via or through a bus 306. Examples of the bus 306 may include, but are not limited to, a data bus, an address bus, and a control bus. The bus 306 may be, for example, a serial bus, a bi-directional bus or a unidirectional bus.

In an embodiment, the processing module 302 may be configured to determine motion information associated with a block of video data. The block of video data is associated with the video content. In an embodiment, the motion information may include a motion vector associated with the block of video data. The motion vector may include, but is not limited to, a predicted motion vector associated with the block of video data, and/or a motion vector associated with the block of video data. The block of video data includes a region within the video content, for example a block of pixels or one or more macro blocks. In an embodiment, the motion information may be received from an external storage device, such as, an external memory or a memory location within a video capture device. Examples of video capturing device may include, a camera device, a video encoding device, a personal computer (PC), a tablet PC, a personal digital assistant (PDA), a mobile communication device, a web appliance, a general purpose processor, a digital signal processor, a hard wired control system, a multiprocessor system, an embedded system and/or any machine capable of executing a set of instructions (sequential and/or otherwise) for capturing and/or storing the video content.

In an embodiment, based on the motion information, the processing module 302 is configured to determine a degree of randomness associated with the block of video data. In an embodiment, the processing module 302 is configured to determine the degree of randomness based on at least one of a motion vector associated with the block of video data and a predicted motion vector associated with the block of video data. In an example embodiment, the degree of randomness ($\Delta$) is given by equation (2):

$$\Delta = abs(mvd \cdot x) + abs(mvd \cdot y) \quad (2)$$

wherein, abs( ) represents an absolute value function or a modulus function, mvd is representative of a difference vector between the predicted motion vector and the motion vector associated with the block of video data, mvd·x is a horizontal component of the difference vector, mvd, and mvd·y is a vertical component of the difference vector, mvd.

In an embodiment, the processing module 302 is configured to compare the determined degree of randomness ($\Delta$) with a first predetermined threshold degree of randomness. In an embodiment, the first predetermined threshold degree of randomness is determined based on at least one of an average of degrees of randomness of a plurality of blocks of video data and a temporal distance between the video content and a reference video content. In an example embodiment, the first predetermined threshold degree of randomness ($\Delta thr$) may be computed based on equation (3):

$$(\Delta thr) = \min(\Delta avg/4, 2d) \quad (3)$$

where, $\Delta avg$ is an average of degrees of randomness of a plurality of blocks of video data associated with the video content, and d is a temporal distance between the video content and reference video content. The term 'temporal distance', as used herein, may be construed as referring to a positional difference between a pair of pictures arranged in a capture order. In an embodiment, the reference video content associated with a video content may include, for example, a previously encoded video content referred to while encoding the video content.

In an embodiment, parameters such as temporal distance (d) and the average of degrees of randomness ($\Delta avg$) may assume different values for different scenarios. For example, the values of temporal distance (d) and/or the average of degrees of randomness ($\Delta avg$) for single-pass encoding and/or multi-pass encoding may depend on a reference index associated with reference video content, an average degree of randomness of a plurality of blocks of video data in a previously encoded video content, a temporal distance between the previously encoded video content and/or reference video content associated with the previously encoded video content. As used herein, the term 'single-pass encoding' may be construed as referring to a technique of encoding involving a video encoder making a single pass through a video sequence and dynamically setting one or more bit rates for the video content associated with the video sequence thereof.

Additionally, the term 'multi-pass encoding' may be construed as referring to a technique of video encoding involving the video encoder making multiple passes through a video sequence for analyzing various parameters associated with encoding the video sequence. As the bit rate of the video content varies as a function of a complexity of the video content, during multi-pass encoding the video encoder may for example, build a complexity profile for the video content during a first pass, and may encode the video sequence during a subsequent pass according to the complexity profile built during the first pass. In an embodiment, for example, for a single-pass encoding, the temporal distance (d) of equation (3) may be a temporal distance between the video content and reference video content associated with a reference index 0. In another embodiment, for example, for multi-pass encoding, the average of degrees of randomness ($\Delta avg$) may be computed for a plurality of blocks of video data in a previously encoded video content and the temporal distance (d) may be a temporal distance between the previously encoded video content and reference video content associated with the previously encoded video content.

In an embodiment, the processing module 302 is further configured to classify the block of video data as a random block or a stationary block based on the comparison. In an embodiment, the processing module 302 is configured to classify the block of video data as a random block when the determined degree of randomness is determined to be higher than the first predetermined threshold degree of randomness. In an embodiment, the processing module 302 is configured to classify the block of video data as a stationary block when the determined degree of randomness is determined to be one of less than and equal to the first predetermined threshold degree of randomness.

In an embodiment, the processing module 302 is further configured to determine a number of random blocks in a neighbouring region of the block of video data. The random blocks in the neighbouring region may include, for example, blocks in a top region, a top left region, a top right region, a left region, a right region, a bottom region, a bottom left region, or a bottom right region of the block of video data and that are previously classified as random blocks. The processing module 302 is further configured to compare the number of the random blocks determined in the neighbouring region of the block of video data with a predetermined threshold number. In an embodiment, the processing module 302 is configured to classify the block of video data as one of a random block and a stationary block based on the comparison. For example, upon/subsequent to determining the number of the one or more random blocks in the neighbouring region of the block of video data being less than or equal to the predetermined threshold number, the processing module 302 is configured to classify the block of video data as a stationary block. In another embodiment, the processing module 302 is configured to classify the block of video data as a random block upon or subsequent to determining the number of random blocks in the neighbouring region of the block of video data being greater than the predetermined threshold number. In an embodiment, the predetermined threshold number is 3, such that upon or subsequent to determination of the number of random blocks in the neighbouring region of the block of video data being 3 or less, the block of video data may be classified as a stationary block. Alternatively or additionally, subsequent to the determination of the number of random blocks in the neighbouring region of the block of video data being greater than 3, the processing module 302 is configured to classify the block of video data as the random block.

In another embodiment, the processing module 302 is configured to compare the determined degree of randomness ($\Delta$) of the block of video data with a plurality of threshold degrees of randomness for modulating the value of the QP parameter associated with the video data. For example, the plurality of threshold degrees of randomness may include N number of threshold degree of randomness, such as, for example, $\Delta thr1$, $\Delta thr2$, $\Delta thr3$, and so on up to $\Delta thrN-1$, where N is a positive integer. The processing module 302 is further configured to classify the block of video data into a category of blocks from among a plurality of categories of blocks based on the comparison. Each of the plurality of categories of the blocks is associated with a range of values associated with the threshold degree of randomness. In an embodiment, N number of categories of blocks may be defined corresponding to the N number of predetermined threshold degrees of randomness, such that a first category of blocks may correspond to a degree of randomness ($\Delta$) less than $\Delta thr1$, a second category may correspond to a degree of randomness ($\Delta$) greater than or equal to $\Delta thr1$ and less than $\Delta thr2$, and so on. In an embodiment, the number of categories defined may be greater than or equal to two.

Each of the blocks of video data is assigned a new value of QP based on the classification for performing the quantization of the block of video data. In the present embodiment, the quantization module 304 is configured to modulate a value of QP associated with the block of video data based on the category of blocks to which the block of video data is classified. In an embodiment, the quantization module 304 is configured to adjust the value of QP of the block of video data based on a first predetermined value from among a plurality of predetermined values. In an embodiment, each of the plurality of categories of blocks is associated with a first predetermined value from among the plurality of predetermined values. In another embodiment, two or more category of blocks may be associated with a first predetermined value from among the plurality of predetermined values. The plurality of predetermined values may include, for example, floating point numbers. The new value of QP for the block of video data that is obtained by modulating the value of QP may be represented as $QP_{new}$. In an embodiment, the $QP_{new}$ is computed based on equation (4):

$$QP_{new} = Q * \mod F \quad (4)$$

wherein, Q is the value of QP for the block of video data that is determined based on a rate control mechanism, and
mod F is the modulation factor.

In the present embodiment, modulation factor (mod F) of equation (4) may assume values corresponding to the predetermined value $F_M$ corresponding to the $M^{th}$ category of blocks that the block of video data is classified into. For example, upon classifying the block of video data into a first category of blocks associated with a first predetermined value $F_1$, the value of $QP_{new}$ may be computed to be equal to $Q*F_1$. The classification of the blocks of video data into the plurality of categories of blocks and the corresponding scheme of modulation of the value of QP is described further in FIG. 3B.

FIG. 3B illustrates an exemplary table 308 depicting classification of a block of video data into a category of bocks from among a plurality of categories of blocks and modulation of the value of QP based on the classification, in accordance with an embodiment. More particularly the table 308 of FIG. 3B includes a plurality of categories of blocks 310, a criterion for classification 312 into corresponding categories of blocks, and a scheme of modulation of the value of QP 314 for each of the plurality of categories of blocks 310. In the exemplary table 308, the plurality of categories of blocks 310 includes N number of categories, including category #1, category #2, and so on up to category N, N being a positive integer. In an embodiment, a minimum number of categories defined is two. As depicted in FIG. 3B, the block of video data is classified into category #1, upon a degree of randomness ($\Delta$) associated with the block of video data being lesser than a first threshold degree of randomness $\Delta thr1$ and is classified into category #2, upon $\Delta$ associated with the block of video data being lesser than a second threshold degree of randomness $\Delta thr2$ and greater than or equal to first threshold degree of randomness $\Delta thr1$. Similarly, the block of video data is classified into category #X-1, upon $\Delta$ associated with the block of video data being lesser than $\Delta thrX-1$ and greater than or equal to $\Delta thrX-2$ and is classified into category #X, upon $\Delta$ associated with the block of video data being lesser than $\Delta thrX$ and greater than or equal to $\Delta thrX-1$ and so on. Each of the plurality of categories 310 of blocks are associated with a modulation factor from among a plurality of modulation factors ranging from $F_1$ to $F_N$. In an embodiment, the value of QP for the block of video data is modulated based on the category of blocks to which the block of video data is classified and the corresponding modulation factor from among the plurality of modulation factors. For example, upon classifying the block of video data into the category #1, the value of QP associated with the block of video data is modulated based on a modulation factor $F_1$ corresponding to the category #1, such that a new value of QP, $QP_{new}$ is computed as $Q*F_1$. Similarly, upon classifying the block of video data into the category #N, the value of QP associated with the block of video data is modulated based on a modulation factor $F_N$ corresponding to the category #N, such that a new value of QP, $QP_{new}$ is computed as $Q*F_N$ as depicted in FIG. 3B.

Referring now to FIG. 3A, in another embodiment, instead of classifying the block of video data into the stationary blocks and the random blocks or into a category of blocks from among a plurality of categories of blocks, each block of video data is assigned a new value of QP based on the degree of randomness associated with the respective block of video data for performing the quantization of the block of video data. In the present embodiment, the quantization module 304 is configured to modulate a value of QP associated with the block of video data based on the degree of randomness associated with the video content. In an embodiment, the quantization module 304 is configured to modulate the value of QP relative to an extent of offset of the degree of randomness of the block of video data from a second predetermined threshold degree of randomness. For example, the quantization module 304 is configured to increase or decrease the value of QP relative to the second predetermined degree of randomness.

In an embodiment, the second predetermined degree of randomness is a variable value determined based on an average degree of randomness of a plurality of blocks of video data or a picture associated with the video content or a previously encoded video content. In an embodiment, upon or subsequent to the determination of the degree of randomness being more than the second predetermined threshold degree of randomness, the quantization module 304 is configured to increase the value of QP associated with the block of video data previously determined through a rate control mechanism. The rate control mechanism regulates a bit rate associated with the video content to avoid a buffer overflow or underflow for constant bit rate applications. In an embodiment, upon/subsequent to determination of the degree of randomness being less or equal to the second predetermined threshold degree of randomness, the quantization module 304 is configured to decrease the value of QP associated with the block of video data previously determined through the rate control mechanism.

In an embodiment, the value of QP associated with each block of video data of the video content is modulated separately based on the degree of randomness of each block of video data. For example, if the video content is a frame including a plurality of macro blocks, the degree of randomness for each macro block is determined and the value of QP for each macro block is modulated accordingly based on the determined degree of randomness. In an embodiment, the quantization module 304 is configured to modulate the value of QP relative to an extent of offset of the degree of randomness of the block of video data from the second predetermined threshold degree of randomness. In an embodiment, upon/subsequent to the determination of the degree of randomness being more than the second predetermined threshold degree of randomness, the quantization module 304 is configured to increase the value of QP associated with the block of video data previously determined through the rate control mechanism. The quantization module 304 may be configured to increase the value of QP for the block of video data relative to an extent of offset of the degree of randomness of the block of video data from the second predetermined threshold degree of randomness. In an embodiment, upon/subsequent to determination of the degree of randomness being less or equal to the second predetermined threshold degree of randomness, the quantization module 304 is configured to decrease the value of QP associated with the block of video data previously determined through the rate control mechanism. The quantization module 304 may be configured to decrease the value of QP for the block of video data relative to an extent of offset of the degree of randomness of the block of video data from the second predetermined threshold degree of randomness.

In the present embodiment, the new value of $QP_{new}$ of equation (4) is a function of the degree of randomness of the block of video data and an average degree of randomness of a plurality of blocks of video data associated with the video content. Also, in the present embodiment, the mod F of equation (4) may assume a value that may be computed based on equation (5):

$$\mod F=[(\omega*\Delta i+\beta*\Delta avg)/(\omega*\Delta avg+\beta*\Delta i)] \quad (5)$$

wherein, mod F being the modulation factor for an $i^{th}$ block of video data associated with the video content, $\Delta i$ is the degree of randomness of $i^{th}$ block of video data, $\omega$ and $\beta$ are empirical values, and $\Delta avg$ is an average degree of randomness of a plurality of blocks of video data associated with the video content (e.g., in the case of single pass encoding) or an average degree of randomness of a plurality of blocks of video data associated with a previously encoded video content (e.g., in the case of multi-pass encoding).

In an embodiment, the quantization module 304 is configured to modulate the value of QP relative to an extent of offset of the degree of randomness of the block of video data from the second predetermined threshold degree of randomness based on equations (4) and (5). In an embodiment, the quantization module 304 is configured to either increase or decrease the value of QP so as to correspondingly increase or decrease respectively the quantization step size.

In another embodiment, upon classifying the block of video data into a stationary block and a random block, each of the blocks of video data is assigned a new value of QP based on the degree of randomness associated with the respective block of video data. In the present embodiment, the quantization module 304 is configured to apply a coarse quantization to the block of video data classified as the random block. In an embodiment, the quantization module 304 is configured to apply a fine quantization to the block of video data that is classified as the stationary block. In an embodiment, the quantization module 304 is configured to increase the value of QP for the block of video data relative to a second predetermined value upon/subsequent to the block of video data being classified as a random block. In an embodiment, the increase in the value of QP relative to the second predetermined value facilitates in the coarser quantization of the block of video data. In an embodiment, the quantization module 304 is configured to decrease the value of QP for the block of video data relative to a third predetermined value upon/subsequent to the block of video data being classified as a stationary block. In an embodiment, the decrease in the value of QP relative to the third predetermined value facilitates in the finer quantization of the block of video data.

In an embodiment, the modulation factor (mod F) of equation (4) may assume one of the values associated with a modulation factor for a random block ($\alpha_{Rndm}$) and a modulation factor for a stationary block ($\alpha_{Stnry}$) based on whether the block of video data is classified as a random block or a stationary block, respectively. In an embodiment, the second predetermined value for increasing the value of QP is substantially equivalent to the value of mod F corresponding to the random block and the third predetermined value is substantially equivalent to the value of mod F corresponding to the stationary block. In an embodiment, the modulation factors for the random block ($\alpha_{Rndm}$) and the stationary block ($\alpha_{Stnry}$) are given by equations (6) and (7) respectively:

$$\alpha_{Rndm} = (\Delta_{avg} + K_{Rndm}*\Delta_{avgRndm})/(K_{Rndm}*\Delta_{avg} + \Delta_{avgRndm}) \quad (6)$$

$$\alpha_{Stnry} = (\Delta_{avg} + K_{Stnry}*\Delta_{avgStnry})/(K_{Stnry}*\Delta_{avg} + \Delta_{avgStnry}) \quad (7)$$

wherein, $\Delta_{avg}$ is an average degree of randomness of a plurality of blocks of video data associated with the video content (e.g., in the case of single pass encoding) or an average degree of randomness of a plurality of blocks of video data associated with a previously encoded video content (e.g., in the case of multi-pass encoding), $\Delta_{avgRndm}$ is an average of degree of randomness of all random blocks in the picture, $\Delta_{avgStnry}$ is an average of degree of randomness of all stationary blocks in the picture, $K_{Rndm}$, and $K_{Stnry}$ are sensitivity factors. The $K_{Rndm}$, and $K_{Stnry}$ may be varied to correspondingly control the modulation of quantization steps size relative to the degree of randomness.

In an embodiment, the value of $\alpha_{Stnry}$ may be less than 1.0, and the value of $\alpha_{Rndm}$ may be more than 1.0. In an embodiment, the sensitivity factor $K_{Rndm}$ is configured to control an extent of change in the quantization step size for the random blocks. In an embodiment, the sensitivity factor $K_{Rndm}$ may be equal to 4. In an embodiment, the sensitivity factor $K_{Stnry}$ is configured to control an extent of change in the quantization step size for the stationary blocks. In an embodiment, the value of $K_{Stnry}$ may be computed based on the equation (8):

$$K_{Stnry} = N_{Stnry}/((N_{Stnry} + N_{Rndm}) - \theta*N_{Rndm}) \quad (8)$$

wherein, $N_{Rndm}$ and $N_{Stnry}$ are the number of random blocks and the number of stationary blocks, respectively associated with a picture of the video content, and $\theta$ is a measure of randomness associated with the picture. In an embodiment, the value of $\theta$ may be determined based on the following equation (9):

$$\theta = (1 + K_{Rndm}*\text{entropy}_{Rndm})/(K_{Rndm} + \text{entropy}_{Rndm})) \quad (9)$$

wherein $\text{entropy}_{Rndm}$ is entropy of a random block.

In an embodiment, the entropy of the random block is computed based on $\Delta_{avgRndm}$ and $\Delta_{avg}$. In an embodiment, the entropy of the random block is given by equation (10)

$$\text{entropy}_{Rndm} = (\Delta_{avgRndm}/\Delta_{avg}) \quad (10)$$

In an example embodiment, during the single pass encoding, parameter values for the parameters $\Delta_{avg}$, $\Delta_{avgRndm}$, $\Delta_{avgStnry}$, $N_{stationary}$, and $N_{random}$ computed from a previously encoded picture are used for performing the modulation of the value of QP, such that a temporal distance between the previously encoded picture and a reference picture associated with the previously encoded picture is same as the temporal distance between a picture being encoded during a single pass encoding and a reference picture associated with the picture being encoded. In an embodiment, the processing module 302 is configured to reclassify the blocks of video data as stationary blocks or random blocks at the end of encoding a picture using $\Delta_{avg}$ value that was computed for the current encoded picture.

The modulation of QP based on equations (6) to (10) shifts the average value of the QP for the blocks of video data by a value $QP_{diff}$. In an embodiment, the value of $QP_{diff}$ may be computed based on equation (11):

$$QP_{diff} = (20 \log_{10}(\alpha_{Stnry})*N_{Stnry} + 20 \log_{10}(\alpha_{Rndm})* N_{Rndm})/(N_{Stnry} + N_{Rndm}) \quad (11)$$

Based on equation (11), it may be ascertained that the value of $QP_{diff}$ corresponds to $2^{(QPdiff/6)}$ in a Qscale domain. In an embodiment, the value of $QP_{new}$ for the blocks of video data classified as either random blocks or stationary blocks is adjusted so as to keep the average value of QP for the blocks of video data unaltered despite the modulation of QPs for the various blocks of video data of the picture. This is achieved by adjusting the value of QP for each block of video data classified as either random blocks or stationary blocks, based on equation (12).

$$QP_{new} = Q*\text{mod } F*(2^{(QPdiff/6)}) \quad (12)$$

In an embodiment, the system 300 may additionally include other components (not shown), such as, for example, an input unit (e.g., a video processing device), a video display unit (e.g., a liquid crystals display (LCD), a cathode ray tube (CRT), and the like), a cursor control device (e.g., a mouse), a drive unit (e.g., a disk drive), a signal generation unit (e.g., a speaker) and/or a network interface unit. The drive unit includes a machine-readable medium upon which are stored one or more sets of instructions (e.g., software) embodying one or more of the methodologies and/or functions described herein. In an embodiment, the software resides, either completely or partially, within the processing module 302 and/or the quantization module 304, during the execution thereof by the system 300 such that the processing module 302, and/or the quantization module 304 also constitute machine-readable media.

The software may further be transmitted and/or received over a network via or through the network interface unit. The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions that may be executed by the system 300 such that the execution of these instructions causes the system 300 to perform one or more of the methodologies of the various embodiments. Furthermore, the term "machine-readable medium" may be construed to include, but shall not be limited to, solid-state memories, optical and magnetic media, and carrier wave signals. A method of quantization of video content is described herein with reference to FIG. 4.

Figure 4:
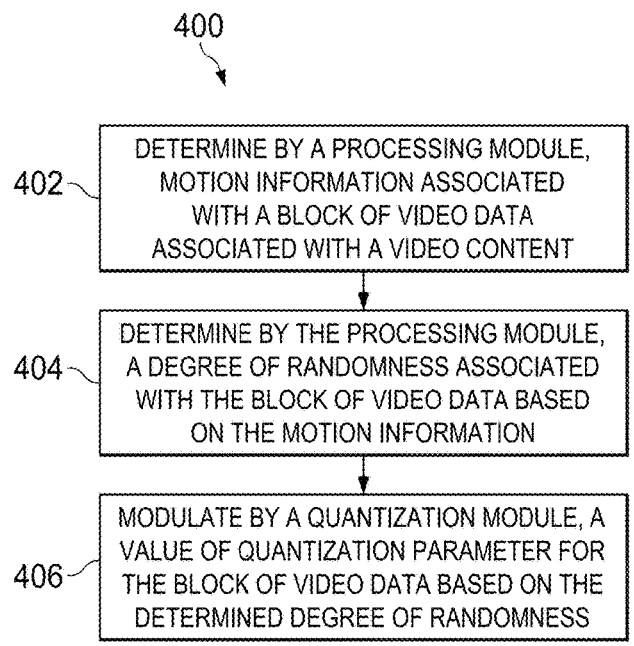
FIG. 4 is a flow diagram of method of quantization of video content, in accordance with an embodiment.

FIG. 4 is a flow diagram of a method 400 of quantization of a video content, in accordance with an embodiment. Examples of the video content may include, but is not limited to, one or more pictures, one or more frames, and one or more fields. At operation 402, motion information associated with a block of video data of the video content is determined. In an embodiment, the motion information is determined by a processing module, for example the processing module 302 (refer FIG. 3A). In an embodiment, if the video content is a bi-directional picture (B-picture) with a pair of reference frames including a forward reference frame and a backward reference frame, the motion information is determined based on one of the forward reference frame and the backward reference frame. At operation 404, a degree of randomness associated with the block of video data is determined by the processing module (for example, processing module 302 of FIG. 3A) based on the motion information. In an embodiment, the degree of randomness is determined by the processing module, for example the processing module 302 (refer FIG. 3A). It is noted that the term "degree of randomness" is an extent of in-coherency in motion of a block of video data associated with the video content relative to one or more blocks of video data associated with the video content.

In an embodiment, the degree of randomness may be determined based on the motion information associated with the video content. For example, the degree of randomness may be determined based on the equation (2) explained with reference to FIG. 3A. In an embodiment, the determined degree of randomness is compared with a first predetermined threshold degree of randomness. In an embodiment, the determined degree of randomness is compared with the first predetermined threshold degree of randomness by the processing module, for example the processing module 302 (refer FIG. 3A). In an embodiment, the first predetermined threshold degree of randomness is determined based on an average degree of randomness of a plurality of blocks of video data in the video content and a temporal distance between the video content and reference video content associated with the video content (e.g., in the case of single pass encoding). In an embodiment, the first predetermined threshold degree of randomness is determined based on an average degree of randomness of the plurality of blocks of video data in a previously encoded video content and a temporal distance between the previously encoded video content and reference video content associated with the previously encoded video content (e.g., in the case of multi-pass encoding). The first predetermined threshold degree of randomness may be determined based on the equation (3) explained with reference to FIG. 3A.

In an embodiment, the block of video data may be classified as one of a stationary block and a random block based on the degree of randomness determined for the block of video data. In an embodiment, the classification is performed by the processing module (for example, processing module 302 of FIG. 3A). For example, the block of video data is classified as a random block when the degree of randomness is determined to be higher than the first predetermined threshold degree of randomness. In an embodiment, the block of video data is classified as a stationary block when the degree of randomness is determined to be less than or equal to the first predetermined threshold degree of randomness. In an embodiment, a number of random blocks is determined in a neighbouring region of the block of video data. The random blocks in the neighbouring region may include, for example, blocks in a top region, a top left region, a top right region, a left region, a right region, a bottom region, a bottom left region, and/or a bottom right region of the block of video data and that are previously classified as random blocks. In an embodiment, the number of the random blocks determined in the neighbouring region of the block of video data is compared with a predetermined threshold number. In an embodiment, the value of the predetermined threshold number may be 3. The block of video data is classified as the random block upon/subsequent to the number of the one or more neighbouring regions associated with the blocks of video data being greater than the predetermined threshold number. In an embodiment, the block of video data is classified as the random block by the processing module, for example, the processing module 302 (refer FIG. 3A).

At operation 406, a value of a quantization parameter (QP) associated with the block of video data is modulated based on the degree of randomness associated with the video content for performing the quantization of the block of video data. In an embodiment, the value of QP is modulated by a quantization module, for example the quantization module 304 (refer FIG. 3A). In an embodiment, the value of QP is increased relative to a second predetermined value upon or subsequent to classifying the block of video data as a random block. In an embodiment, the value of QP is decreased relative to a third predetermined value upon or subsequent to classifying the block of video data as a stationary block. The value of QP may be decreased based on a computation of a number of random blocks associated with the video content, a number of stationary blocks associated with the video content, an average of degree of randomness of all random blocks in the video content, and/or an average of degree of randomness of all stationary blocks in the video content. In an embodiment, the value of QP may be decreased as explained with reference to equations (4), (6), and (7) (refer FIG. 3A). In an embodiment, the second predetermined value and/or the third predetermined value are computed based on an average of degree of randomness of all random blocks in the video content and/or an average of degree of randomness of all stationary blocks in the video content. In an embodiment, the second predetermined value and/or the third predetermined value are computed based on equations, such as equations (6), and (7), as explained with reference to FIG. 3A.

In another embodiment, modulating the value of QP associated with the blocks of video data includes assigning a new value of QP to the respective blocks of video data based on the degree of randomness. In the present embodiment, instead of classifying the block of video data into a stationary block and a random block, each of the blocks of video data is assigned a new value of QP based on the degree of randomness associated with the respective block of video data. In the present embodiment, the QP of each of the block of video data may be computed based on the degree of randomness of the block of video data and/or an average degree of randomness of a plurality of blocks of video data associated with the video content. In an embodiment, the QP for each of the block of video data may be computed based on equation (5) (refer FIG. 3A). In an embodiment, the QP is computed by the processing module (for example, processing module 302 of FIG. 3A). In an embodiment, the degree of randomness of the block of video data is compared with a second predetermined degree of randomness. The second predetermined degree of randomness is a variable value determined based on an average degree of randomness of a plurality of blocks of video data or a picture associated with the video content or a previously encoded video content.

Based on the comparison, upon or subsequent to determination of the degree of randomness of the block of video data being greater than the second predetermined threshold degree of randomness, the value of QP is increased relative to an extent of offset in the degree of randomness of the block of video data from the second predetermined threshold degree of randomness. Also, upon or subsequent to the degree of randomness of the block of video data being less than or equal to the predetermined threshold degree of randomness, the value of QP is decreased relative to an extent of offset in the degree of randomness of the block of video data from the second predetermined threshold degree of randomness. In an embodiment, the QP is either increases or decreased by the quantization module (for example, quantization module 304 of FIG. 3A).

In another embodiment, the modulating the value of QP associated with the blocks of video data of the video content includes comparing the determined degree of randomness of the block of video data with a plurality of threshold degrees of randomness. In an embodiment, the comparison is performed by a quantization module, for example the quantization module 304 (refer FIG. 3A). The plurality of threshold degrees of randomness may include, for example, N number of threshold degree of randomness, such as, for example, $\Delta thr1$, $\Delta thr2$, $\Delta thr3$, and so on up to $\Delta thrN-1$, N being a positive integer. The block of video data may be classified into a category of blocks from among a plurality of categories based on the comparison. In an embodiment, the classification is performed by the quantization module, for example the quantization module 304 (refer FIGS. 3A and 3B). Each of the plurality of categories of the blocks is associated with a range of values associated with the threshold degree of randomness.

Consider, for example, N number of categories of blocks may be defined corresponding to the N number of predetermined threshold degrees of randomness, such that a first category of blocks may correspond to a degree of randomness less than $\Delta thr1$, a second category may correspond to a degree of randomness greater than or equal to $\Delta thr1$ and less than $\Delta thr2$, and so on (refer FIG. 3B). Each of the blocks of video data is assigned a new value of QP based on the classification for performing the quantization of the block of video data. In the present embodiment, the value of QP associated with the block of video data is modulated based on the category of blocks to which the block of video data is classified. In an embodiment, the value of QP is modulated by the quantization module (for example, quantization module 304 of FIG. 3A). In an embodiment, the value of QP of the block of video data is adjusted based on a first predetermined value from among a plurality of predetermined values. In an embodiment, each of the plurality of categories of blocks is associated with a first predetermined value from among the plurality of predetermined values. In another embodiment, two or more category of blocks may be associated with a first predetermined value from among the plurality of predetermined values. The plurality of predetermined values may include, for example, floating point numbers. The modulation of the value of QP based on the classification of the block of video data into the category of blocks is described herein with reference to FIG. 3A.

FIG. 5 depicts a flow diagram of a method 500 of quantization of video content, in accordance with another embodiment. Examples of the video content may include, but is not limited to, one or more pictures, one or more frames, and one or more fields. In an embodiment, the video content may be a frame having a plurality of blocks. In an embodiment, each of the plurality of blocks may include a macro block. In an embodiment, the plurality of blocks may be processed such that the perceptual quality of the video content associated with low bit-rates is increased. In an embodiment, processing of video content comprises quantization of a plurality of blocks associated with the video content. It is noted that the term "quantization" is construed as referring to a process of compressing data including a range of values associated with the video content to a single quantum value. Since the quantization process involves compression of the set of values to a single value, it is an irreversible and a lossy compression process, and results in generation of a quantization noise. Various video coding paradigms define a discrete set of quantization settings, such as a quantization step size, for performing quantization of the video content. The quantization step size is described herein with reference to equation (1). The quantization settings may be identified by an identifier such as a QP. The value of QP may include, for example, an integer that indexes one or more quantization settings. The value of QP may determine an amount of quantization noise introduced during the quantization.

At operation 502, a value QP associated with a block of video data is determined. In an embodiment, the value of QP may be determined based on a rate control mechanism. As is understood, the rate control mechanism is configured to regulate a bit-rate associated with the video content, thereby avoiding a buffer overflow or underflow for constant bit-rate applications. In various encoding paradigms, such as H.264, a total of 52 quantization step size values are supported and each quantization step size value is indexed by the value of QP. In an embodiment, the quantization step size value doubles in size for every increment of 6 in the value of QP. Examples values of QP in the H.264 encoding paradigm may range from 0 to 51, and the corresponding quantization step size values may range from 0.625, 0.6875, 0.8125, and so on up to 224. In an embodiment, the block of video data includes a region within the video content, for example a block or a macro block. At operation 504, motion information associated with the block of video data is determined. In an embodiment, the motion information associated with the block of video data may be determined based on a technique of motion estimation. In an embodiment, the motion information includes one or more motion vectors associated with the block of video data. In an embodiment, the one or more motion vectors may include, but is not limited to, predicted motion vectors and motion vectors associated with a block of video data associated with a current video content.

At operation 506, a degree of randomness of the block of video data is determined based on the motion information. More specifically, the degree of randomness of the block of video data is determined based on the computed motion information. The degree of randomness is indicative of an extent of in-coherency in motion of the block of video data relative to one or more blocks of video data in a neighbouring region of the block of video data. At operation 508, it may be determined whether the degree of randomness associated with the block of video data exceeds a first predetermined threshold degree of randomness. If it is determined at operation 508, that the degree of randomness does not exceed the first predetermined threshold degree of randomness, then operation 510 is performed. If, however it is determined at operation 508 that the degree of randomness exceeds the first predetermined threshold degree of randomness, then at operation 512, the block of video data is classified as a random block. As used herein, the term random block may be construed as referring to a region of the video content comprising objects that are associated with a large extent of in-coherency in activity/motion. At operation 514, it is determined whether the block of video data belongs to a set of random blocks. In an embodiment, the set of random blocks includes random blocks in a neighbouring region (e.g., top region, top left region, top right region, bottom region, bottom right region, bottom left region, and left region) of the block of video data associated with the video content.

If it is determined at operation 514 that the block of video data belongs to the set of random blocks, then at operation 516, the value of QP for the block of video data is increased relative to a second predetermined value. The second predetermined value is explained herein with reference to equations (4), (6), and (7) (refer FIG. 3A). If however it is determined at operation 514 that the block of video data does not belong to the set of random block, then operation 510 is performed. At operation 510, the block of video data is classified as a stationary block, and at operation 518, the value of QP for the block of video data classified as the stationary block is decreased relative to a third predetermined value. The third predetermined value is explained herein with reference to equations (4), (6), and (7) (refer FIG. 3A). In an embodiment, by increasing or decreasing the value of QP, a quantization step size associated with the video content is correspondingly increased or decreased, respectively. The blocks of video data are quantized based on the increased or decreased quantization step sizes. In an embodiment, the value of QP for the blocks of video data classified as either random blocks or stationary blocks is adjusted so as to keep an average value of QP for the blocks of video data unaltered despite the modulation of QPs for the various blocks of video data. This is achieved by adjusting the value of QP for each block of video data based on equations (11) and (12) (refer FIG. 3A). The blocks of video data are quantized based on the modulated value of QP.

Figure 6B:
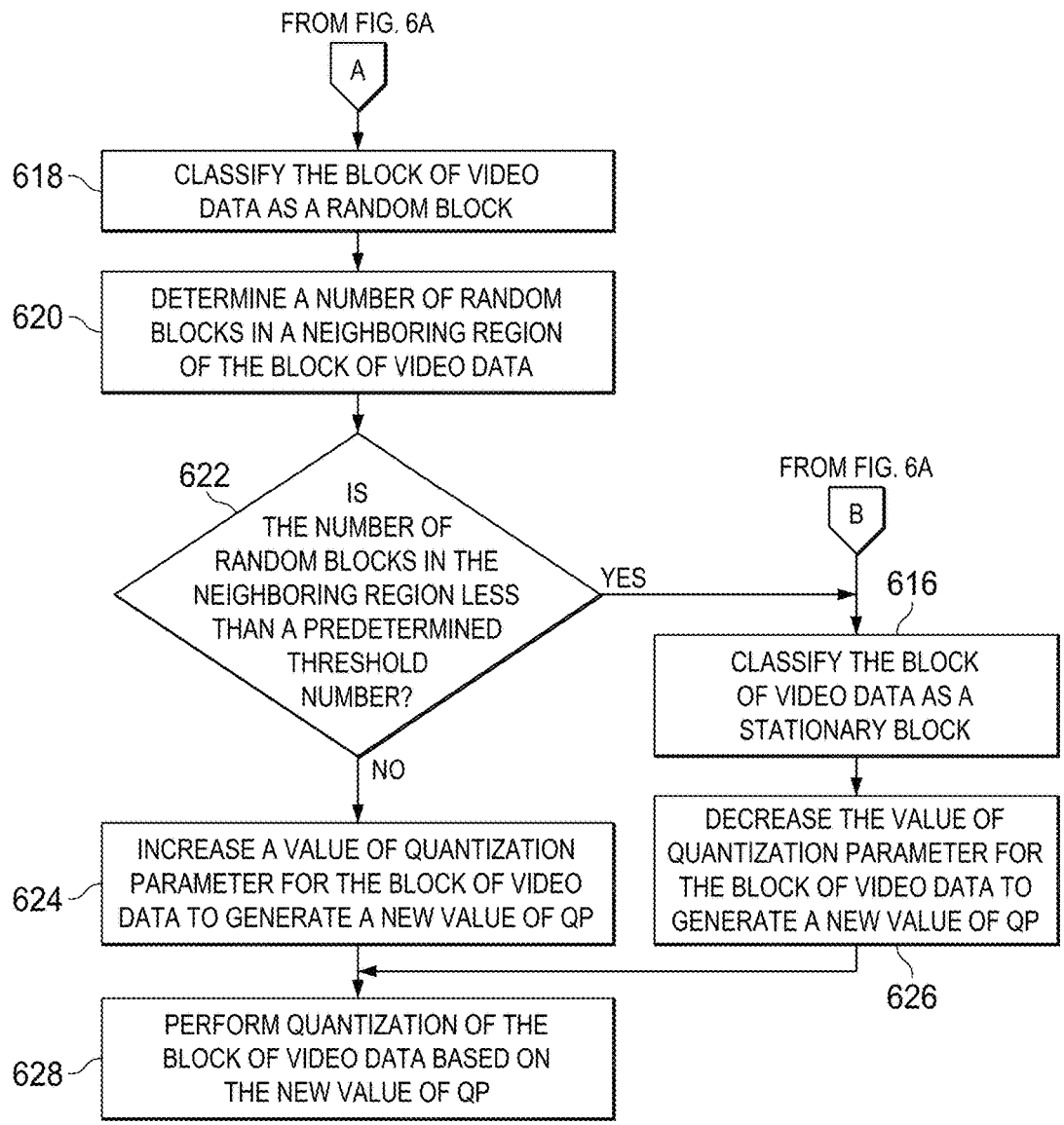

FIGS. 6A-6B depicts a flow diagram of a method 600 for quantization of video content, in accordance with yet another embodiment. Examples of the video content may include, but is not limited to, one or more pictures, one or more frames, and one or more fields. In an embodiment, the video content may be a frame having a plurality of blocks of video data. As explained with reference to FIG. 1, during an encoding process, a prediction for each block of the plurality of blocks of video data is determined, and subtracted from the respective block to determine a residual video content. In an embodiment, the prediction for each block of the frame may be performed based on previously encoded blocks either from a current frame (e.g., intra prediction) or from frames that have already been encoded and transmitted (e.g., inter prediction). In an embodiment, the residual video content is transformed and quantized, thereby enabling the encoding of the video content with a high efficiency.

In an embodiment, at operation 602 of the method 600 for quantization of the video content, the motion estimation of a block of video data associated with the video content is performed. In an embodiment, the block of video data comprises a bi-directional frame. In an embodiment, the motion estimation of the block of video data is performed based on one of a forward reference frame and a backward reference frame associated with the block of video data. At operation 604, one of the forward reference frame and the backward reference frame is selected for performing the motion estimation. If the forward reference frame is selected for performing the motion estimation, then operation 606 is performed. If, however, the backward reference frame is selected at operation 604, then operation 608 is performed.

At operation 606, motion information associated with the block of video data is determined based on the forward reference frame. Subsequent to the determination of the motion information based on the forward reference at operation 606, a degree of randomness associated with the block of video data is determined based on the determined motion information at operation 610. In an embodiment, the degree or randomness associated with the block of video data may be determined based on the computation performed in equation (2) (Refer FIG. 3A).

If however, the backward reference frame is selected at operation 604, then the motion information associated with the block of video data is determined based on the backward reference frame at operation 608. In an embodiment, the motion information may include one or more motion vectors associated with the block of video data. Subsequent to determination of the motion information based on the backward reference at operation 608, a degree of randomness associated with the block of video data is determined based on the determined motion information, at operation 612. Subsequent to determination of the degree of randomness at one of the operations 610 and 612, at operation 614, it is determined whether the degree of randomness associated with the block of video data is greater than a first predetermined threshold degree of randomness. If the degree of randomness is determined to be less than or equal to the first predetermined threshold degree of randomness, then the block of video data is classified as a stationary block, at operation 616. In an embodiment, the term stationary block may be construed as referring to a region of a video content that is associated with a small extent of in-coherency or a large extent of coherency in activity/motion.

If however, the degree of randomness is determined to be greater than the first predetermined threshold degree of randomness, then at operation 618, the block of video data is classified as a random block. In an embodiment, the term random block may be construed as referring to a region of a video content associated with a large extent of in-coherency in activity/motion. At operation 620, a number of random blocks in a neighbouring region of the block of video data is determined. The neighbouring region includes a top region, a top left region, a top right region, a left region, bottom region, bottom left region, or bottom right region of the block of video data. At operation 622, it is determined whether the number of random blocks determined at operation 620, is less than a predetermined threshold number. In an embodiment, the predetermined threshold number may be 3. It will however be understood that the predetermined threshold number may be any value other than 3 depending on various applications. If the number of random blocks in the neighbouring region of the block of video data is determined to be greater than the predetermined threshold number, then at operation 624a value of QP for the block of video data is increased so as to generate a new value of QP. In an embodiment, the new value of QP may be increased based on a modulation factor associated with the random block. In an embodiment, the modification factor may be determined based on equations (6) described with reference to FIG. 3A. In an embodiment, the value of QP is increased relative to a second predetermined value for all blocks of video data determined as random blocks.

If, at operation 622, the number of random blocks in the neighbouring region of the block of video data is determined to be less than the predetermined threshold number, then at operation 616, the block of video data is classified as a stationary block. Subsequent to the classification of the block of video data as the stationary block, a value of QP associated with the block of video data is decreased to generate a new value of QP at operation 626. In an embodiment, the new value of QP may be decreased based on a modulation factor associated with the stationary block. In an embodiment, the modification factor may be determined based on equations (7) described with reference to FIG. 3A. In an embodiment, the value of QP is decreased relative to a third predetermined value for all the blocks of video data determined as stationary blocks. In an embodiment, by increasing or decreasing the value of QP based on the determination of degree of randomness associated with the block of video data, a quantization step-size is correspondingly increased or decreased, respectively. At operation 628, a quantization of the plurality of blocks of video data associated with the video content is performed based on the new values of QP.

Figure 7:
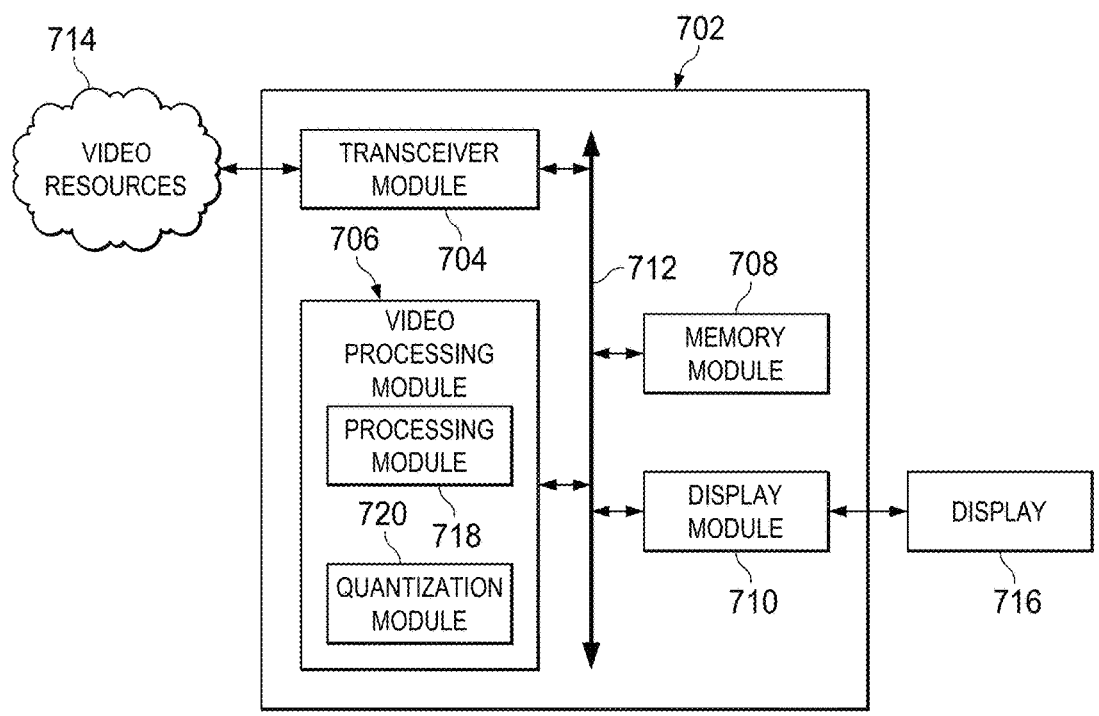
FIG. 7 is a block diagram of an integrated circuit (IC) for quantization of video content, in accordance with an embodiment.

FIG. 7 is a block diagram of an integrated circuit 702 for encoding video content, in accordance with an embodiment.

The integrated circuit 702 comprises a transceiver module 704, a video processing module 706, a memory module 708 and a display module 710. The transceiver module 704, the video processing module 706, the memory module 708 and the display module 710 are communicatively associated with each other using data path 712. The transceiver module 704 is communicatively associated with a plurality of video resources 714 and is configured to receive video content from one or more video resources from among the plurality of video resources 714. Examples of the video resources may include, but are not limited to (1) remote video systems (2) media capture devices like camera, and camcorders, and (3) video storage devices like magnetic tapes, disks, and computer readable media. In an embodiment, the transceiver module 704 may include an antenna and/or network connectors to connect to wired networks (for example, local area networks (LANs)) and wireless networks (for example, cellular networks) or combination thereof (for example, internet). Examples of network connectors may include, but is not limited to, a universal serial bus (USB) interface, a wireless LAN interface, an infrared interface, an ethernet port.

The video processing module 706 is configured to perform encoding of video content. In an embodiment, the encoding of the video content comprises various processes such as motion estimation/compensation, transformation, quantization and entropy encoding. In an embodiment, subsequent to encoding of the video content, the video processing module 706 is configured to provide the video content to the transceiver module 704 for transmission purposes or to memory module 708 for storage purposes. In an embodiment, the video processing module 706 may be configured to provide the encoded video content to the display module 710 for displaying video content on a display 716.

In an embodiment, the video processing module 706 may be configured to include components of system 300 FIG. 3A. For example, the video processing module 706 may include components such as a processing module 718 similar to the processing module 302 of FIG. 3A and a quantization module 720 similar to the quantization module 304 of FIG. 3A. The processing module 718 and the quantization module 720 within the video processing module 706 are configured to perform functions as discussed in FIG. 3A.

The memory module 708 is configured to store the video content subsequent to quantization and/or encoding of video content. Examples of memory module 708 may include, but are not limited to, random access memory (RAM), dual port RAM, synchronous dynamic RAM (SDRAM), double data rate SDRAM (DDR SDRAM). The display module 710 is configured to facilitate display of the video content on the display 716. The display 716 may be facilitated, for example, in response to a user input received using a user interface (not shown in FIG. 7). Examples of the display 716 may include, but are not limited to, a light crystal display (LCD) panel, a plasma display panel, and a field emission display.

In an embodiment the integrated circuit 702 may be an application processor chip. In an embodiment, the integrated circuit 702 may be a part of general processor chip embedded within a video system. Examples of the video systems may include, but are not limited to, (1) video devices, such as cellular phones, digital video cameras and digital camcorders; (2) data processing devices, such as personal computers, laptops and personal digital assistants; and (3) consumer electronics, such as set top boxes, digital video disk (DVD) players and video network servers.

Without in any way limiting the scope, interpretation, or application of the claims appearing below, advantages of one or more of the exemplary embodiments disclosed herein include improvement in a compression efficiency of video content without increasing a noticeable visual distortion and an improvement in a quality of the video content at low bit-rates as well as high bit-rates. By employing coarse quantization of random blocks and fine quantization of stationary blocks, the present technology enables controlling a bit-rate distribution for blocks of video data associated with the video content, thereby leading to an improvement in the quality of the video content at low bit rates as well. The present technology enables reduction in an average bit-rate requirement of the random blocks and allotment of additional bits to the stationary blocks. The present technology enables quantization based on spatial as well as temporal properties (e.g., in terms of the degree of randomness) of the video content.

Although the present technology has been described with reference to specific exemplary embodiments, it is noted that various modifications and changes may be made to these embodiments without departing from the broad spirit and scope of the present technology. For example, the various systems, modules, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various modules and methods may be embodied using transistors, logic gates, and electrical circuits (e.g., application specific integrated circuit (ASIC) circuitry and/or in Digital Signal Processor (DSP) circuitry).

Particularly, the system 300 of FIG. 3A, which comprises the processing module 302 and a quantization module 304, may be enabled using software and/or using transistors, logic gates, and electrical circuits (e.g., integrated circuit circuitry such as ASIC circuitry). Embodiments of the present disclosure include one or more computer programs stored or otherwise embodied on a computer-readable medium, wherein the computer programs are configured to cause a processor to perform one or more operations, such as for example, operations 402-406 for method 400. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, subsystems and methods described and illustrated in the various embodiments as discrete or separate may be combined or integrated with other systems, modules, techniques, or methods without departing from the scope of the present technology. Other items shown or discussed as directly communicatively associated or communicating with each other may be communicatively associated through some interface or device, such that the items may no longer be considered directly communicatively associated with each other but may still be indirectly communicatively associated and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:
    determining motion information associated with a block of video data;
    determining a degree of randomness for the block of video data based on the motion information; and
    modulating a value of a quantization parameter (QP) for the block of video data based on the determined degree of randomness.

2. The method of claim 1, further comprising:
    comparing the determined degree of randomness with a plurality of threshold degrees of randomness;
    classifying the block of video data into a category of blocks from among a plurality of categories of blocks based on the comparison, each of the plurality of categories of the blocks being associated with a range of values associated with the threshold degree of randomness; and
    adjusting the value of QP of the block of video data based on a first predetermined value from among a plurality of predetermined values, the first predetermined value corresponding to the category of blocks.

3. The method of claim 1, further comprising prior to modulating:
    comparing by the processing module, the determined degree of randomness with a first predetermined threshold degree of randomness; and
    classifying by the processing module, the block of video data as one of:
        a random block when the determined degree of randomness is higher than the first predetermined threshold degree of randomness, and
        a stationary block when the determined degree of randomness is one of less than and equal to the first predetermined threshold degree of randomness.

4. The method of claim 3, wherein modulating the value of the QP comprises performing one of:
    increasing the value of QP relative to a second predetermined value subsequent to classifying the block of video data as the random block; and
    decreasing the value of QP relative to a third predetermined value subsequent to classifying the block of video data as the stationary block.

5. The method of claim 4, further comprising:
    adjusting the modulated value of QP so as to maintain an average value of QP for a plurality of blocks of video data associated with a picture subsequent to the modulation of the value of the QPs for the plurality of blocks.

6. The method of claim 3, wherein the first predetermined threshold degree of randomness is determined based on an average degree of randomness of a plurality of blocks of video data, and a temporal distance between the video data and reference video data.

7. The method of claim 3, wherein the first predetermined threshold degree of randomness is determined based on an average degree of randomness of a plurality of blocks of video data and a temporal distance between the video data and reference video data.

8. The method of claim 3, wherein classifying comprises:
    determining a number of random blocks in a neighboring region of the block of video data;
    comparing the number of the random blocks determined in the neighboring region of the block of video data with a predetermined threshold number; and
    classifying the block of video data as the random block subsequent to determination of the number of the random blocks in the neighboring region of the block of video data being greater than the predetermined threshold number.

9. The method of claim 1, wherein the motion information comprises at least one of a motion vector associated with the block of video data and a predicted motion vector associated with the block of video data.

10. The method of claim 1, further comprising:
    comparing by the processing module, the determined degree of randomness associated with the block of video data with a second predetermined threshold degree of randomness; and
    performing by the quantization module, one of:
        increasing the value of QP for the block of video data subsequent to a determination that the degree of randomness of the block of video data is greater than the second predetermined threshold degree of randomness, wherein the value of QP is increased relative to an extent of offset in the degree of randomness of the block of video data from the second predetermined threshold degree of randomness; and
        decreasing the value of QP of the block of video data subsequent to a determination that the degree of randomness of the block of video data is one of less than and equal to the second predetermined threshold degree of randomness, wherein the value of QP is decreased relative to an extent of offset in the degree of randomness of the block of video data from the second predetermined threshold degree of randomness.

11. The method of claim 10, wherein the second predetermined threshold degree of randomness is determined based on an average degree of randomness of a plurality of blocks of video data or a previously encoded video data.

12. A system comprising:
a processing module configured to:
   determine motion information associated with a block of video data; and
   determine a degree of randomness for the block of video data based on the motion information; and
a quantization module configured to modulate a value of quantization parameter (QP) for the block of video data based on the determined degree of randomness.

13. The system of claim 12, wherein the processing module is further configured to:
compare the determined degree of randomness with a plurality of threshold degrees of randomness; and
classify the block of video data into a category of blocks from among a plurality of categories of blocks based on the comparison, each of the plurality of categories of the blocks being associated with a range of values associated with the threshold degree of randomness.

14. The system of claim 13, wherein the quantization module is further configured to:
adjust the value of QP of the block of video data based on a first predetermined value from among a plurality of predetermined values, the first predetermined value corresponding to the category of blocks that the block of video data is classified into.

15. The system of claim 12, wherein the processing module is further configured to:
compare the determined degree of randomness with a first predetermined threshold degree of randomness; and
classify the block of video data as one of:
   a random block when the determined degree of randomness is higher than the first predetermined threshold degree of randomness, and
   a stationary block when the determined degree of randomness is one of less than and equal to the first predetermined threshold degree of randomness.

16. The system of claim 15, wherein the quantization module is further configured to:
increase the value of QP relative to a second predetermined value subsequent to classifying the block of video data as the random block; and
decrease the value of QP relative to a third predetermined value subsequent to classifying the block of video data as the stationary block.

17. The system of claim 15, wherein the processing module is further configured to:
determine a number of random blocks in a neighboring region of the block of video data; and
compare the number of the random blocks determined in the neighboring region of the block of video data with a predetermined threshold number.

18. The system of claim 17, wherein the quantization module is further configured to:
classify the block of video data as the random block subsequent to the determination of the number of the random blocks in the neighboring region of the block of video data being greater than the predetermined threshold number.

19. The system of claim 12, wherein the quantization module is further configured to:
increase the value of QP for the block of video data subsequent to the degree of randomness of the block of video data being greater than a threshold degree of randomness, wherein the value of QP is increased relative to an extent of offset in the degree of randomness of the block of video data from the threshold degree of randomness; and
decrease the value of QP of the block of video data subsequent to the degree of randomness of the block of video data being one of less than and equal to the threshold degree of randomness, wherein the value of QP is decreased relative to an extent of offset in the degree of randomness of the block of video data from the threshold degree of randomness.

20. A non-transitory computer-readable medium storing a set of instructions that when executed cause a computer to perform a method, the method comprising:
determining motion information associated with a block of video data;
determining a degree of randomness for the block of video data based on the motion information; and
modulating a value of a quantization parameter (QP) for the block of video data based on the determined degree of randomness.

* * * * *